United States Patent [19]

Lindert et al.

[11] Patent Number: 4,457,790
[45] Date of Patent: Jul. 3, 1984

[54] TREATMENT OF METAL WITH GROUP IV B METAL ION AND DERIVATIVE OF POLYALKENYLPHENOL

[75] Inventors: Andreas Lindert; Jack Kramer, both of Troy, Mich.

[73] Assignee: Parker Chemical Company, Madison Heights, Mich.

[21] Appl. No.: 490,580

[22] Filed: May 9, 1983

[51] Int. Cl.³ .............................................. C23F 7/08
[52] U.S. Cl. ............................ 148/6.15 R; 106/14.11; 106/14.12; 106/14.13; 106/14.15; 148/6.14 R; 427/388.2; 427/388.3; 427/409; 524/398; 524/413
[58] Field of Search .................. 252/512, 518; 427/96, 427/98, 58, 388.2, 388.3, 409; 428/901; 524/413, 398; 106/14.11, 14.12, 14.13, 14.15

[56] References Cited

U.S. PATENT DOCUMENTS

| | | | |
|---|---|---|---|
| 3,196,039 | 7/1965 | Herbst et al. | 427/388.4 |
| 3,544,356 | 12/1970 | Vazirani | 427/207.1 |
| 4,032,513 | 6/1977 | Fujiwara et al. | 524/543 X |
| 4,165,242 | 8/1979 | Kelly et al. | 427/409 X |
| 4,233,088 | 11/1980 | Kronstein | 148/6.15 R X |

Primary Examiner—Thurman K. Page
Attorney, Agent, or Firm—Arthur E. Kluegel

[57] ABSTRACT

A treatment solution for contacting a metal surface comprises:
  from about 0.001% to about 1.0% of a metal ion selected from the group consisting of titanium, zirconium and hafnium and mixtures thereof; and
  an effective amount of a soluble or dispersible treatment compound selected from the group consisting of a polymer having the following general formula, acid salts thereof, and mixtures thereof:

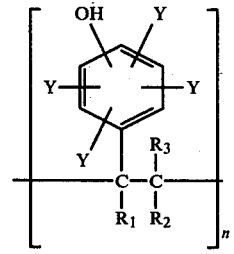

where:
  $R_1$ through $R_3$ are hydrogen or an alkyl group having from 1 to about 5 carbon atoms;
  each Y is hydrogen, Z, $CR_4R_5OR_6$, $CH_2Cl$, or an alkyl or aryl group having from 1 to 18 carbon atoms;
  Z is

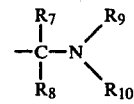

$R_4$ through $R_{10}$ are hydrogen, or an alkyl, aryl, hydroxy-alkyl, amino-alkyl, mercapto-alkyl or phospho-alkyl moiety, said $R_4$ through $R_{10}$ being of carbon chain lengths up to a length at which the compound is not soluble or dispersible; and
  n is from 2 up to a number at which the polymer is not soluble or dispersible.

Preferably, the solution is an aqueous solution and "Z" moieties are present in sufficient amount that the compound is water soluble or water dispersible. Metal surfaces contacted with the above treatment solution have enhanced corrosion resistance and paint adhesion characteristics.

20 Claims, No Drawings

TREATMENT OF METAL WITH GROUP IV B METAL ION AND DERIVATIVE OF POLYALKENYLPHENOL

BACKGROUND OF THE INVENTION

The present invention relates to the art of metal surface treatment. More specifically, the present invention relates to treatment of metal surfaces with a solution comprising a metal ion selected from the group consisting of titanium, zirconium and hafnium ions and mixtures thereof and a poly-alkenylphenol derivative or an acid salt of a poly-alkenylphenol derivative. Optionally, the solution can also comprise a compound selected from the group consisting of thiourea, a derivative of thiourea, tannic acid, a vegetable tannin and mixtures thereof. The treatment imparts improved corrosion resistance and paint adhesion characteristics to the metal surfaces.

The need for applying protective coatings to metal surfaces for improved corrosion resistance and paint adhesion characteristics is well known in the metal finishing and other metal arts. Traditionally, metal surfaces are treated with chemicals which form a metal phosphate and/or metal oxide conversion coating on the metal surface to improve the corrosion resistance and paint adhesion thereof. Also traditionally, the conversion coated metal surface have been rinsed or post-treated with a solution containing a hexavalent chromium compound for even greater corrosion resistance and paint adhesion.

Because of the toxic nature of hexavalent chromium compounds, expensive treatment equipment must be used to remove chromates from plant effluent to prevent the pollution of rivers, streams, and drinking water sources. Hence, although the corrosion resistance and paint adhesion characteristics of conversion coated metal surfaces can be enhanced by an after-treatment solution containing a hexavalent chromium compound, in recent years there have been research and development efforts directed to discovering effective alternatives to the use of such post-treatment solutions. One alternative is provided in an earlier U.S. patent application of Andreas Lindert, Ser. No. 210,910 for "Composition for and Method of After-Treatment of Phosphatized Metal Surfaces" filed on Nov. 28, 1980. Another alternative is provided in U.S. patent application of Andreas Lindert, Ser. No. 490,579, co-filed herewith. It would, however, be desirable to have further improved post-treatment solutions having improved performance characteristics and requiring shorter treatment times.

In accordance with the present invention a novel compostion which is an alternative to hexavalent chromium compound containing solutions is provided for use in post-treatment solutions in a novel process for the post-treatment of phosphatized or conversion coated metal surfaces. Also, the present invention provides a solution and method for treating previously untreated metal surfaces including aluminum, steel and zinc metal surfaces. The solution and method of the present invention provide a coating on the metal surface and are effective to enhance the corrosion resistance and paint adhesion characteristics of a conversion coated or uncoated metal surface whether previously conversion coated or not. Further understanding of this invention will be had from the following disclosure wherein all parts and percentages are by weight unless otherwise indicated.

SUMMARY OF THE INVENTION

A treatment solution of the present invention for contacting a metal surface is a solution comprising:

from about 0.001% to about 1.0% of a metal ion selected from the group consisting of titanium, zirconium and hafnium and mixtures thereof; and an effective amount of a soluble or dispersible treatment compound selected from the group consisting of a polymer having the following general formula, acid salts thereof, and mixtures thereof:

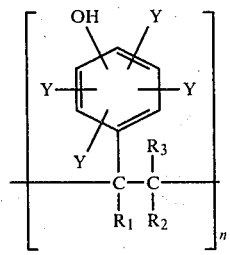

where:
R$_1$ through R$_3$ are hydrogen or an alkyl group having from 1 to about 5 carbon atoms;
each Y is hydrogen, Z, CR$_4$R$_5$OR$_6$, CH$_2$Cl, or an alkyl or aryl group having from 1 to 18 carbon atoms;

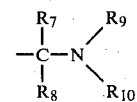

R$_4$ through R$_{10}$ are hydrogen, or an alkyl, aryl, hydroxy-alkyl, amino-alkyl, mercapto-alkyl or phospho-alkyl moiety, said R$_4$ through R$_{10}$ being of carbon chain lengths up to a length at which the compound is not soluble or dispersible; and
n is from 2 up to a number at which the polymer is not soluble or dispersible.

Preferably the solution is an aqueous solution and Z moieties are present in sufficient amount that the compound is water soluble or water dispersible.

In addition to the above ingredients, the treatment solution of the present invention can optionally comprise from about 0.01% to about 4.0% of a compound selected from the group consisting of thiourea, a derivative of thiourea, tannic acid, a vegetable tannin and mixtures thereof.

In accordance with the method of the present invention, a metal surface is contacted with the above treatment solution to enhance the corrosion resistance and paint adhesion characteristics of the metal surface.

DETAILED DESCRIPTION OF THE INVENTION

Although the solution of the invention can be effectively applied to treated or untreated metal surfaces, generally speaking the best results will be obtained if the metal surface has previously been conversion coated. Conversion coatings are well known and have been described, for example, in *Metal Handbook*, Volume II, 8th Edition, pages 529–547 of the American Society for Metals and in *Metal Finishing Guidebook and Directory,* pages 590–603 (1972), the contents of both of which are specifically incorporated by reference herein.

In a typical metal treatment operation employing a composition and process of this invention, the metal to be treated is initially cleaned by a chemical or physical process and water rinsed to remove grease and dirt from the surface. The metal surface is then brought into contact with the treatment solution of this invention. Alternatively, instead of applying the treatment solution following the cleaning process, a conversion coating solution is applied to the metal surface in a conventional manner to form a conversion coating thereon. The conversion coated surface is then water rinsed and the metal surface is immediately brought into contact with the treatment solution of the present invention.

The present invention is useful with a broad range of metal surfaces, including metals having surfaces which have been conversion coated with suitable conversion coating compositions such as iron phosphate, manganese phosphate, zinc phosphate, zinc phosphate modified with calcium, nickel, or magnesium ions, mixed metal oxide, and titanium or zirconium organometallic coatings. Examples of suitable metal surfaces include zinc, iron, aluminum and cold-rolled, ground, pickled, and hot-rolled steel and galvanized steel surfaces. As used herein, the term "metal surface" includes both untreated metal surfaces and conversion coated metal surfaces.

The treatment solution of the present invention is a solution comprising metal ions and a soluble or dispersible treatment compound. The metal ions in the treatment solution are present in an amount of from about 0.001% to about 1.0% and are selected from the group consisting of titanium, zirconium and hafnium ions and mixtures thereof. It will be appreciated that these ions are of Group IV B transition metals of the Periodic Table of the Elements and may be provided by the addition of their soluble acids, for example, hexafluorotitanic acid, hexafluorozirconic acid, or hexafluorohafnic acid, or salts, for example, nitrate, sulfate, fluoride, acetate, citrate, and/or chloride salts.

Use of the aforementioned metal ions in addition to the treatment compound can improve both the effectiveness or performance of the treatment solution in use and also can reduce the time of application of treatment solution to the metal surface to as short a time as from about 2 to about 5 seconds, as may be required for use on a coil line.

The treatment is selected from the group consisting of a polymer having the following general formula, acid salts thereof and mixtures thereof:

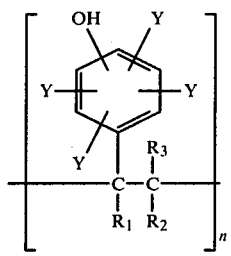

where:

$R_1$ through $R_3$ are hydrogen or an alkyl group having from 1 to about 5 carbon atoms;

each Y is hydrogen, Z, $CR_4R_5OR_6$, $CH_2Cl$, or an alkyl or aryl group having from 1 to 18 carbon atoms;

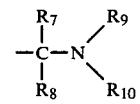

$R_4$ through $R_{10}$ are hydrogen, or an alkyl, aryl, hydroxy-alkyl, amino-alkyl, mercapto-alkyl or phospho-alkyl moiety, said $R_4$ through $R_{10}$ being of carbon chain lengths up to a length at which the compound is not soluble or dispersible; and n is from 2 up to a number at which the polymer is not soluble or dispersible.

While the alkyl group of the polymer backbone or chain in the above formula can be located in the ortho, meta or para positions to the hydroxyl group on the aromatic ring of the phenol, monomer units of the above general formula are preferably selected from the para and ortho forms.

It will be appreciated that in the polymeric form, the treatment compound of the present invention can comprise a plurality of different specific monomer units each of the above general formula. For example, a polymeric compound of this invention can have the following general formula:

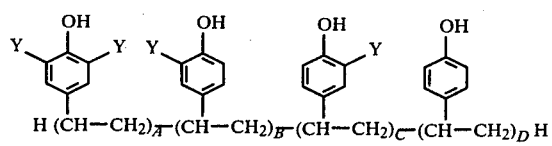

where Y is defined as above (but is not hydrogen) and wherein A, B, C, and D can be from 0 to a number at which the polymer is not soluble or dispersible in the solvent under the conditions of use. $A+B+C+D$ must be at least 2 and, if the water is the solvent then the methylene amine moiety, the Z moiety as defined above, must be present in sufficient amount so that when neutralized with an acid, the polymer is water soluble or water dispersible. The particular amount as a molar percent needed for water solubility or dispersibility depends upon the molecular weight of the polymers as well as the particular $R_4$ through $R_{10}$ moieties in the polymer. Generally speaking, the molar percent of amino group or Z per phenolic group may vary from 10% to 200% and is usually 50% to 150%; there being one phenolic group per monomer.

It will, of course, be appreciated that the treatment compound of the present invention is based on derivatives of poly-alkenylphenol polymer. Examples of poly-alkenylphenols or substituted alkenylphenols useful in the present invention include isopropenylphenol, isobutenylphenol, dimethylvinylphenol and the like. Suitable derivatives having the above general formula can be made, for example, by the Mannich Reaction. For example, a poly-4-vinylphenol polymer can be reacted with formaldehyde and a secondary amine to yield a product which can be neutralized with an organic or inorganic acid to yield a water soluble or dispersible solution or emulsion of the treatment compound of this invention.

The molecular weight of the poly-alkenylphenol used in the preparation of derivatives claimed in the present invention can range from the dimer, or more usually low molecular weight oligomers of 360 to high molecular weight polymers of 30,000 or greater. The upper limit of molecular weight being determined by the functional limitation that the derivative therefrom be soluble or dispersible.

The resulting derivatives of the formula set forth hereinabove will typically have a molecular weight of up to about 200,000, with molecular weights within the range of about 700 to about 70,000 being preferred. In the formula given for these derivatives, a typical upper value for "n" is about 850, with values of from about 10 to 300 being preferred. Similarly, the carbon chain lengths of the $R_4$ through $R_{10}$ substituents will typically be from about 1 to 18, with carbon chain lengths of from about 1 to 12 being preferred. It will, of course, be appreciated, that in each instance, a value for "n" and for the carbon lengths, as well as the percent of the "Z" moiety, will be selected which will provide the desired amount of water solubility and/or dispersibility.

The treatment compounds of this invention are soluble in organic solvents and can be used as a treatment solution when dissolved in an organic solvent as, for example, ethanol. Advantageously, however, the treatment compounds can also be used in aqueous solution. To provide water solubility or water dispersibility of the compound, an organic or inorganic acid can be used for neutralization of the "Z" moiety thereof. Useful acids for this purpose are acetic acid, citric acid, oxalic acid, ascorbic acid, phenylphosphonic acid, chloromethylphosphonic acid; mono, di and trichloroacetic acid, trifluoroacetic acid, nitric acid, phosphoric acid, hydrofluoric acid, sulfuric acid, boric acid, hydrochloric acid, hexafluorosilicic acid, hexafluorotitanic acid, hexafluorozirconic acid, and the like; alone or in combination with each other. The addition of water to the neutralized, over neutralized or partially neutralized treatment compounds mentioned above results in a water soluble or dispersible solution or emulsion of the polymer useful for metal treatment.

The pH of the aqueous solution can vary from pH 0.5 to 12, but for practical purposes is usually kept between 2.0 to 8.0 both for the stability of the solution and for best results on the treated metal surface.

It is contemplated that the treatment compound of the present invention generally will be used in a working solution at a dilute concentration of, for example, from about 0.01% to about 5% by weight. Practically speaking, a concentration of 0.025% to 1% is preferrred in a working solution. However, under some circumstances, for example, for transporting or storing the solution, a concentrate of the solution may be preferred. Also, it is contemplated that the treatment solution may comprise a pigment, i.e., be a paint composition having a film forming component which can be the treatment compound itself, a solvent and an organic or inorganic pigment.

Of course, the treatment solution of the present invention can comprise ingredients in addition to the aforementioned metal ions and treatment compound. For example, the treatment solution can also comprise from about 0.01% to about 4.0% of an ingredient selected from the group consisting of thiourea, alkyl or aryl thiourea compounds, tannic acid, vegetable tannins or gall tannins and mixtures thereof. Examples of suitable ingredients include methyl, ethyl or butyl thiourea, wattle, mangrove or chestnut tannins, oak gall tannin, and valonea acorn cup extract.

Application of the treatment solution of the present invention in the treatment step to a metal surface can be carried out by any conventional method. While it is contemplated that the metal surface will preferably be a conversion coated metal surface, the treatment step can alternatively be carried out on an untreated metal surface to improve the corrosion resistance and paint adhesion thereof. For example, the treatment solution can be applied by spray coating, roller coating, electrocoating or dipping. The temperature of the solution applied can vary over a wide range, but is preferably from 70° F. to 160° F. After application of the treatment solution to the metal surface, the surface can optionally be rinsed, although good results can be obtained without rinsing after treatment. For some end uses, for example, in electrocoat paint application, rinsing may be preferred.

Next, the treated metal surface is dried. Drying can be carried out by, for example, circulating air or oven drying. While room temperature drying can be employed, it is preferable to use elevated temperatures to decrease the amount of drying time required.

After drying, the treated metal surface is then ready for painting or the like. The surface is suitable for standard paint or other coating application techniques such as brush painting, spray painting, electro-static coating, dipping, roller coating, as well as electrocoating. As a result of the treatment step of the present invention, the conversion coated surface has improved paint adhesion and corrosion resistance characteristics. Further understanding of the present invention can be had from the following illustrative examples.

EXAMPLE 1

100 lbs. of 95% ethanol solvent was charged into a 100 gallon stainless steel reactor containing a turbine blade, nitrogen sparge and condenser. Gentle heating to 50° C. was started, and 80 lbs. of poly-4-vinylphenol polymer of a molecular weight of 5000 was slowly added to the solvent with good stirring. After all of the polymer was added, the reactor was closed and heated to 80° C. to aid in dissolving the remaining polymer. The reactor was then cooled to 40° C. and 50 lbs. of N-Methylaminoethanol and 100 lbs. of deionized water were added. Then over one (1) hour 54.1 lbs. of 37% formaldehyde solution was added while maintaining the temperature at 40° C. to ±2° C. The reactor was then heated for 3 hours at 40° C. and 315 lbs. of 10% nitric acid was added and diluted to 10% solids with deionized water to yield a stable solution of a treatment compound of the present invention in water.

EXAMPLE 2

100 g. of cellosolve solvent was charged into a reactor which was a 1000 ml reaction flask equipped with a condenser, nitrogen sparge, overhead mechanical stirrer and thermometer. Then 80 gm of poly-4-vinylphenol having a molecular weight of 5000 was added and dissolved. 70 gm of diethanolamine and 100 gm of deionized water were added and reaction heated to 50° C. 108 gm of 37% formaldehyde solution was added over 1 hour and heated an additional 3 hours at 50° C. and then 3 hours at 80° C. The reaction was cooled and 65 gm of 75% phosphoric acid and then 227 gm of deionized water were added. The product gave a stable solution of a treatment compound of the present invention in water.

EXAMPLE 3

A cold rolled steel 24 gauge panel which had been oiled to prevent corrosion in shipping was cleaned with mineral spirits and then further cleaned using an aqueous solution of a strong alkaline cleaner (sold under the trademark PARCO ® Cleaner 338 by PARKER SURFACE TREATMENT PRODUCTS, OCCIDENTAL CHEMICAL CORP.) by a spray application at 150° F. solution temperature for 60 seconds; followed by the application of an iron phosphate conversion coating (sold under the trademark BONDERITE ® 1014 by PARKER SURFACE TREATMENT PRODUCTS, OCCIDENTAL CHEMICAL CORP.) for 60 seconds at 110° F. After the conversion coating treatment, the panels were rinsed with cold tap water for 30 seconds and then treated with a 0.5% solution of the compound of Example I for 30 seconds at a 110° F. solution temperature by a spray application. The panels were then rinsed and dried in an oven at 350° F. for 5 minutes.

The panels were painted with a standard Duracron ® 200 paint (from PPG Industries) and tested by the standard salt spray method. (ASTM © B-117-61.) After 504 hours, the panels treated with Example I as described above gave results equivalent to the standard chromium treated control panels.

EXAMPLE 4

The procedure of Example 1 was carried out except that after adding 54.1 lbs. of 37% formaldehyde solution, the reaction was then heated for 3 hours at 80° C. and 326 lbs. of 10% phosphoric acid was added and the reactor contents were diluted to 10% solids with deionized water to yield a stable solution of a treatment compound of the present invention in water.

EXAMPLE 5

Cold rolled steel panels were cleaned using a strong alkaline cleaner and the cleaned metal surface was then rinsed with hot water. An iron phosphate conversion coating (BONDERITE ® 1000 made by PARKER SURFACE TREATMENT PRODUCTS, OCCIDENTAL CHEMICAL CORP.) was then applied at 160° F. by spray application and the panels were rinsed with cold water before application of the post-treatment. Dilute solutions of the poly-4-vinylphenol derivatives prepared as in Example 4 were mixed with hexafluorotitanic acid and applied to the phosphated metal at 120° F. Concentration of the poly-4-vinylphenol derivative and hexafluorotitanic acid content was varied from 0.05 to 0.2% and 0.06 to 0.03% respectively. Some of the post-treated panels were water rinsed others were not rinsed. All panels were then baked in a 350° F. oven for 5 minutes. Control panels of PARCOLENE ® 60 were employed.

The above prepared panels were painted with an anodic electrocoat paint system, Powercron ® 300 acrylic electrocoat of PPG Industries, at 120–140 volts for 60–90 seconds at 80° F. in order to obtain a uniform coating appearance and thickness of 0.95–1.00 mils. Cure of the coating was at 325° F. peak metal temperature for 20 minutes. The panels were scribed from corner to corner with an X using a sharp knife and all the way to the bare metal. The panels were subjected to standard salt fog tests in accordance with ASTM B117-61 and compared with chromate treated as well as deionized rinsed controls. Results equivalent to PARCOLENE ® 60 activated chromium control (made by PARKER SURFACE TREATMENT PRODUCTS, OCCIDENTAL CHEMICAL CORP.) were obtained with the poly-4-vinylphenol derivative of 0.1% concentration with hexafluorotitanic acid at 0.03% concentration in the treatment bath.

EXAMPLE 6

Cold-rolled steel (CRS) panels were cleaned and treated to yield an iron phosphate conversion coating on the panel. Temper-rolled galvanized steel panels (TRG) were cleaned and treated to yield conversion coatings of either the zinc phosphate or complex oxide type. Samples of the substrates prepared as described above were then given a 10 second final rinse with one of the following final rinses:

Final Rinse No. 1. Modified chromic acid (PARCOLENE ® 62 made by PARKER SURFACE TREATMENT PRODUCTS, OCCIDENTAL CHEMICAL CORP.)

Final Rinse No. 2. Deionized water.

Final Rinse No. 3. Aqueous solution of 0.25% by weight of an acid salt of a poly-4-vinylphenol derivative, pH 6.0 prepared as in Example 4.

Final Rinse No. 4. Aqueous solution of 0.25% by weight of the acid salt of poly-4-vinylphenol derivative as in number 3 above and 0.015% by weight of titanium ions, added as $H_2TiF_6$, pH 6.1.

The panels were then painted with one and two-coat paint systems:

| Paint 1 | Glidden 71308 | PolyLure 2000 white polyester |
|---|---|---|
| Paint 2 | M & T | black vinyl |
| Paint 3 | Midland | white polyester |
| Paint 4 | Midland-Dexter 9 × 165 | epoxy primer |
|  | Midland-Dexter 5 × 121 | crystal white |
|  | Dexstar ® | polyester topcoat |

The panels were then scribed and subjected to standard ASTM B-117-61 5% salt fog tests, ASTM 2247-64T humidity tests and 180° T-bend adhesion test as described in ASTM D3794-79. The results are set forth below:

| Final Rinse No. | Iron Phosphate Paint 1 192 Hr. | Iron Phosphate Paint 2 192 Hr. | Zinc Phosphate Paint 3 504 Hr. | Zinc Phosphate Paint 4 1008 Hr. | Complex Oxide Paint 3 504 Hr. | Complex Oxide Paint 4 1008 Hr. |
|---|---|---|---|---|---|---|
| 1 | $1-1^{4s}$ | $0-1^s$ FM9 R9 | 0-1 VF + 8 | $0-3^{7s}$ | 55% P MD6 | 0-1 |
| 1 | $0-1^s$ | $0-1^s$ FM9 R8.5 | 0-1 VF + 8 | $0-1^{3s}$ | 55% P MD6 | 0-1 |
| 2 | 70% P | $0-1^s$ D9 R5 | $3-9^{11s}$ F8 | $2-5^{7s}$ | 85% P (192 Hr.) | $7-12^{14s}$ VF + 8 |
| 2 | 70% P | N D9 R5 | $4-8^{11s}$ F6 | $2-4^{8s}$ | 80% P (192 Hr.) | 40% P |
| 3 | $1-2^{3s}$ | $0-1^s$ D9 R5 | $1-2^{3s}$ MD9 | 1-2 | $1-3^{6s}$ MD6 | 0-1 F9 |
| 3 | 1-1 | $0-1^s$ D9 R6 | $1-2^{5s}$ MD 9 | $1-2^{4s}$ | 4-13 MD6 2% P | $0-1^{2s}$ VF + 9 |
| 4 | 2-3 | N D8 R5 | $0-1^s$ MD9 | $0-1^{2s}$ | 0-1 MD8 | $0-1^s$ VF9 |

| | 5% Salt Fog Results | | | | | |
|---|---|---|---|---|---|---|
| Final | Iron Phosphate | | Zinc Phosphate | | Complex Oxide | |
| Rinse No. | Paint 1 192 Hr. | Paint 2 192 Hr. | Paint 3 504 Hr. | Paint 4 1008 Hr. | Paint 3 504 Hr. | Paint 4 1008 Hr. |
| 4 | 2–3$^{4s}$ | 0–1$^s$ D9 R5 | 0–1$^s$ MD9 | 0–1 | 0–1 MD9 | 0–1$^{4s}$ VF + 9 |

VF = very few, F = few, FM = few-medium, MD = medium-dense, D = dense, % P = % peel, R = red rust, s = spot, N = nil.

Reported above is the creepback from the scribe, the amount of blistering, and red rust ratings. The creepback from the scribe produced by the final rinses containing the polymer is substantially less than that of the deionized water final rinse. With the added titanium, the creepback from the scribe with the polymer rinse is less than that of the chromic acid rinse in at least four out of the six cases.

The humidity results for the iron phosphate coated panels rinsed as above were essentially equivalent. The adhesion at a 180° T-bend for the polymer-containing rinses was at least equal to that for the chromic acid rinse, and generally better.

Panels were treated as in Example 6, except that the treatment time was reduced to 5 seconds. Excellent results as compared to chromic acid post-treatments were obtained on zinc phosphate and complex metal oxide conversion coatings but slightly weaker results were obtained on iron phosphate when a solution of poly-4-vinylphenol derivative prepared as in Example 4 was used at 0.1% concentration along with 0.02% hexafluorotitanic acid at a treatment bath pH of 5.1. Improved corrosion resistance resulted by doubling the concentration in the treatment bath of the poly-4-vinylphenol derivative and hexafluorotitanic acid, as well as incorporation of 0.02% thiourea and .05% tannic acid in the above formulation.

EXAMPLE 8

Panels were treated as in Example 5 except each panel was given a 5 second final rinse with one of the solutions below:

| Final Rinse No. | Poly-4-VinylPhenol Derivative Wt. % | H$_2$TiF$_6$ Wt. % | Thiourea Wt. % | Tannic Acid Wt. % | Parcolene ® 62 Modified Chromic Acid Wt. % | pH |
|---|---|---|---|---|---|---|
| 1 | | | | | 0.4 | 2.9 |
| 2 | 0.1 | 0.02 | | | | 5.1 |
| 3 | 0.2 | 0.04 | 0.2 | 0.05 | | 3.6 |

The panels were painted and tested as above. The results with Rinse No. 2 were better than or equal to those with Rinse No. 1, the chromic acid control, except with the iron phosphate system, where the results were good, but somewhat weaker than with the chromic acid control. The results with Rinse No. 3 were better than or equal to those with Rinse No. 2.

While the above disclosure sets forth and describes various embodiments of the present invention, the compositions and methods described are intended to illustrate but not limit the present invention, it being understood that the specific embodiments described herein are subject to variation and modification by one skilled in the art having benefit of the foregoing disclosure. Therefore, it is intended that the scope of the present invention is to be limited solely by the following claims.

What is claimed is:

1. An aqueous solution comprising:
   from about 0.001% to about 1.0% of a metal ion selected from the group consisting of titanium, zirconium, and hafnium ions and mixtures thereof; and
   an effective amount of a soluble or dispersible compound selected from the group consisting of a polymer having the following general formula, acid salts thereof and mixtures thereof:

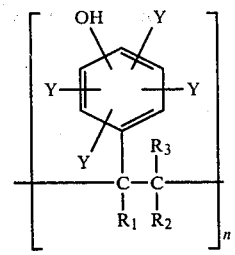

where:
R$_1$ through R$_3$ are hydrogen or an alkyl group having from 1 to about 5 carbon atoms;
each Y is hydrogen, Z, CR$_4$R$_5$OR$_6$, CH$_2$Cl, or an alkyl or aryl group having from 1 to 18 carbon atoms;
Z is

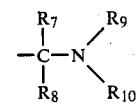

R$_4$ through R$_{10}$ are hydrogen, or an alkyl, aryl, hydroxy-alkyl, amino-alkyl, mercapto-alkyl or phospho-alkyl moiety, said R$_4$ through R$_{10}$ being of carbon chain lengths up to a length at which the compound is not soluble or dispersible; and
n is from 2 up to a number at which the polymer is not soluble or dispersible.

2. The solution of claim 1 wherein said solution is an aqueous solution and the molar percent of Z per monomer is from about 10% to about 200%.

3. The solution of claim 2 wherein the molar percent of Z per monomer is from about 50% to about 150%.

4. The solution of claim 2 wherein the pH is from about 0.5 to about 12.

5. The solution of claim 4 wherein the pH is from about 2.0 to about 8.0.

6. The solution of claim 5 wherein said compound is present in an amount of from about 0.01% to about 5%.

7. The solution of claim 6 wherein said compound is present in an amount of from about 0.025% to about 1%.

8. The solution of claim 2 wherein Z is

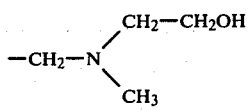

9. The sloution of claim 2 wherein Z is

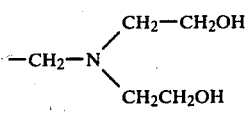

10. The solution of claim 2 wherein said compound is the reaction product of a poly-4-vinylphenol, formaldehyde and a secondary amine.

11. The aqueous solution of claim 2 comprising, in addition, from about 0.01% to about 4.0% of a compound selected from the group consisting of thiourea, a derivative of thiourea, tannic acid, a vegetable tannin and mixtures thereof.

12. The solution of claim 1 comprising, in addition, a pigment.

13. The solution of claim 12 wherein said solution is a paint.

14. A process for treating a metal surface which comprises contacting the metal surface with the solution of claim 1.

15. The process as claimed in claim 14 wherein the solution is an aqueous solution and the molar percent of Z per monomer is from about 10% to about 200%.

16. The process as claimed in claim 15 wherein the solution has a pH from about 0.5 to about 12.

17. The process as claimed in claim 16 wherein the compound is present in the solution in an amount of from about 0.01% to about 5%.

18. The process as claimed in claim 15 wherein the solution also comprises from about 0.01% to about 4.0% of a compound selected from the group consisting of thiourea, a derivative of thiourea, tannic acid, a vegetable tannin and mixtures thereof.

19. The process as claimed in claim 14 wherein the solution also comprises a pigment.

20. The process as claimed in claim 14 wherein the metal surface treated is an aluminum metal surface.

* * * * *

UNITED STATES PATENT AND TRADEMARK OFFICE
CERTIFICATE OF CORRECTION

PATENT NO. : 4,457,790
DATED : July 3, 1984
INVENTOR(S) : Andreas Lindert; Jack Kramer It is certified that error appears in the above-identified patent and that said Letters Patent are hereby corrected as shown below:

At column 1, line 29    the word --surface-- should be "surfaces".

At column 2, line 34    after the word --atoms-- insert "Z is".

At column 3, line 51    after the word --treatment-- insert "compound".

At column 4, line 3    after the word --atoms-- insert "Z is".

At column 9, line 24    insert heading "Example 7".

At column 9, line 37    delete the number --0.02%-- and insert "0.2%".

At column 9, line 57    after the word --control-- delete the period and insert a comma.

Signed and Sealed this

Thirtieth Day of July 1985

[SEAL]

Attest:

DONALD J. QUIGG

Attesting Officer    Acting Commissioner of Patents and Trademarks